US006684208B2

(12) United States Patent
Kil et al.

(10) Patent No.: US 6,684,208 B2
(45) Date of Patent: Jan. 27, 2004

(54) SYSTEM AND METHOD FOR QUANTIFYING AN EXTENT TO WHICH A DATA MINING ALGORITHM CAPTURES USEFUL INFORMATION IN INPUT DATA

(75) Inventors: David Kil, Gilroy, CA (US); Ken Fertig, Palo Alto, CA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 435 days.

(21) Appl. No.: 09/858,768

(22) Filed: May 15, 2001

(65) Prior Publication Data

US 2002/0128997 A1 Sep. 12, 2002

Related U.S. Application Data

(60) Provisional application No. 60/274,008, filed on Mar. 7, 2001.

(51) Int. Cl.[7] .............................. G06F 17/30; G06F 7/00
(52) U.S. Cl. ............................................. 707/5; 707/10
(58) Field of Search ................................ 707/1–5, 10

(56) References Cited

U.S. PATENT DOCUMENTS

| | | | | |
|---|---|---|---|---|
| 5,479,523 | A | 12/1995 | Gaborski et al. | ........... 382/159 |
| 5,727,199 | A | 3/1998 | Chen et al. | .................. 707/6 |
| 6,026,399 | A | * 2/2000 | Kohavi et al. | ................. 707/6 |
| 6,278,997 | B1 | 8/2001 | Agrawal et al. | ............... 707/6 |
| 6,353,816 | B1 | 3/2002 | Tsukimoto | ................... 706/17 |
| 6,460,049 | B1 | * 10/2002 | Becker et al. | ........... 707/104.1 |
| 2002/0138492 | A1 | * 9/2002 | Kil | ............................. 707/100 |

OTHER PUBLICATIONS

Schaffer, C. "Conservation of Generalization: A Case Study (draft)", Department of Computer Science, CUNY/Hunter College, Feb. 20, 1995.*

Kil, D.H. and F.B. Shin "Time–Adaptive Pattern Recognition and Prediction for Situational Robustness", Proceedings of the Oceans '97 MTS/IEEE Conference, pp. 773–778, Oct. 6–9, 1997.*

Shin, F.B. and Kil, D.H. "Classification Cramer–Rao Bounds on Stock Price Prediction", Journal of Forecasting, vol. 17, pp. 389 399, 1998.*

Copy of International Search Report.

Caraca–Valente, P.; Morant, J.L., "Knowledge–Based Systems' Validation When To Stop Running Test Cases," *Int. J. Human–Computer Studies*, vol. 51, pp. 757–781, 1999.

Shin, F., Kil, D., "Classification Cramer–Rao Bounds On Stock Price Prediction," *Journal Of Forecasting*, vol. 17, No. 5–6, pp. 389–399, 1998.

(List continued on next page.)

*Primary Examiner*—John Breene
*Assistant Examiner*—Luke S Wassum
(74) *Attorney, Agent, or Firm*—Reed Smith Crosby Heafey LLP (57) ABSTRACT

A system and method for estimating the point of diminishing returns for additional information in data mining processing applications. The present invention provides a convenient method of estimating the extent to which a data mining algorithm captures useful information in raw feature data. First, the input data is processed using a forward transform. A region of overlap $Y_o$ in the forward transformed data is identified and quantified. The region of overlap $Y_o$ is processed with a reverse transform to create an overlap region Z in an original feature space. The degree of overlap in region Z is quantified and compared to a level of overlap in the $Y_o$ region, such that the comparison quantifies the extent to which a data mining algorithm captures useful information in the input data.

12 Claims, 5 Drawing Sheets

OTHER PUBLICATIONS

Liu, Huan; Setiono, Rudy, "A Probialistic Approach To Feature Selection: A Filter Solution," In *Proc. Thirteenth Int'l Conf. On Machine Learning*, San Francisco, CA: Morgan Kaufmann, pp. 319–327, 1996.

Dash, Manoranjan; Liu, Huan; Motoda, Hiroshi, "Consistency Based Feature Selection," *Proc. 4th Pacific–Asia KDD*, Kyoto, Japan, Apr. 2000, pp. 98–109.

Hilderman, Robert J., Hamilton, Howard J., Applying Objective Interestingness Measures In Data Mining Systems, *Proc. KDD 2000*, Lyon, France, Sep. 2000, pp 432–439.

Boussouf, Moussa, "A Hybrid Approach To Feature Selection," *Proc. KDD 1998*, Nantes, France, Sep. 1998, pp. 230–238.

Tsymbal, Alexey; Puuronen, Seppo, "Bagging And Boosting With Dynamic Integration Of Classifiers", *Proc. KDD 2000*, Lyon, France, Sep. 2000, pp. 116–125.

Todorovski, Ljupco; Dzeroski, Saso, "Combining Multiple Models With Meta Decision Trees", *Proc. KDD 2000*, Lyon, France, Sep. 2000, pp. 54–64.

Ricci, Francesco, Aha: David W., "Error–Correcting Output Codes for Local Learners," In *Proc. European Conference On Machine Learning*; Nedellec, C. and C. Rouveird (eds), Berlin, Germany: Springer–Verlag, pp. 280–291, 1998.

Gamberger, Dragan; Lavra, Nada, "Confirmation Rule Sets," *Proc. KDD 2000*, Lyon, France, Sep. 2000, pp. 34–43.

Tumer, Kagan; Ghosh, Joydeep, "Error Correlation And Error Reduction In Ensemble Classifiers," *Connection Science*, vol. 8, Nos. 3–4, pp. 385–404, 1996.

* cited by examiner

SYSTEM AND METHOD FOR QUANTIFYING AN EXTENT TO WHICH A DATA MINING ALGORITHM CAPTURES USEFUL INFORMATION IN INPUT DATA

CROSS-REFERENCE TO RELATED APPLICATIONS

This application claims priority from U.S. Provisional Patent Application entitled IMPROVED DATA MINING APPLICATION, filed Mar. 7, 2001, Application Ser. No. 60/274,008, the disclosure of which is herein incorporated by reference.

BACKGROUND OF THE INVENTION

1. Field of the Invention

The present invention relates generally to the field of data mining, and more particularly to a system and method for estimating the point of diminishing returns for additional information in data mining processing applications.

2. Description of the Related Art

In data mining (DM) applications, most tools present performance results, but do not indicate how close the performance results are to the ultimate, theoretical upper bounds of performance given a set of possible features. This lack of indication prompts many users to continue their quest for better performance.

In P. Caraca-Valente and J. L. Morant, "Knowledge-based systems' validation when to stop running test cases," *Int. J. Human-Computer Studies*, Vol. 51, pp. 757–781, 1999, the authors explore the issue of when to stop running test cases in knowledge engineering. Their focus is on determining the optimal number of data partitions (test cases) to evaluate the knowledge-based system (KBS) with a specified confidence level. That is, instead of attempting to assess the optimality of a DM algorithm, they derive a theoretical foundation on how many independent tests should be run regardless of a DM algorithm selected.

In F. Shin and D. Kil, "Classification Cramer-Rao Bounds on Stock Price Prediction," *Journal of Forecasting*, Vol. 17, No. 5–6, pp. 389–399, 1998, Shin and Kil discuss this idea in the context of stock-price prediction. However, their approach fails to consider the following important aspects in establishing the level of confidence associated with quantification of the level of useful information being captured by a DM algorithm:

1. No explicit mechanism for finding the inflection point in rank-order curves, which display DM performance as a function of input feature dimension.
2. The use of a single area-of-overlap threshold makes the algorithm sensitive to the value of the threshold.
3. In certain situations, the direct computation of multi-dimensional (MD) class-conditional feature probability density functions (PDFs) is advantageous to using marginal PDFs.

Gaborski et al. (U.S. Pat. No. 5,479,523) discuss an approach to reduce the feature dimension in digit/character recognition. Their system is directed more to identifying an optimal feature subset using a combination of correlation and discrimination weights, not to quantifying the level of optimality from the perspective of a DM algorithm output.

Kohavi and John, "Wrappers for feature subset selection," *Artificial Intelligence*, Vol. 97, Nos. 1–2, pp. 273–324, 1997 also explore a feature-subset selection using a learning algorithm as a wrapper around the feature-subset selection problem, while Liu and Setiono, "A probabilistic approach to feature selection: A filter solution," In *Proc. Thirteenth Int'l Conf. On Machine Learning*, San Francisco, Calif.: Morgan Kaufmann, pp. 319–327, 1996 discuss a probabilistic approach to feature-subset selection. Dash et al. "Consistency Based Feature Selection," *Proc. $4^{th}$ Pacific-Asia KDD*, Kyoto, Japan, April 2000 also explore the issue of feature-subset selection using an inconsistency measure that calculates how capable each feature is of separating different output classes.

Hilderman and Hamilton "Applying Objective Interestingness Measures in Data Mining Systems," *Proc. KDD2000*, Lyon, France, September 2000 describe a two-step process to rank the level of "interestingness" in discovered patterns based on the chi-square test and objective measures of interestingness in association. Boussouf, "A Hybrid Approach to Feature Selection," Proc. KDD'98, Nantes, France, September 1998 discusses a hybrid approach to feature-subset selection based on redundancy and relevancy. Basically, all these approaches focus on feature optimization, not on quantifying the optimality of a backend DM classification algorithm by considering the symbiotic nature between the selected feature subset and the actual DM algorithms employed for the final-stage classification.

On the other hand, some researchers explore the issue of combining (fusing) multiple classification algorithms. In Tsymbal and Puuronen "Bagging and Boosting with Dynamic Integration of Classifiers," *Proc. KDD2000*, Lyon, France, September 2000, the authors discuss bagging and boosting with dynamic integration instead of simple voting in order to combine outputs of multiple classifiers. Todorovski and Dzeroski "Combining Multiple Models with Meta Decision Trees," *Proc. KDD2000*, Lyon, France, September 2000 also explore combining multiple models using an algorithm called stacking or meta learners (a decision tree in this case). Their algorithm stacks another classifier at the outputs of multiple first-stage classifiers to learn how each first-stage classifier views input features. The second-stage meta classifier learns any peculiarity associated with how the first-stage classifiers call in order to improve classification performance further.

Ricci and Aha "Error-correcting output codes for local learners," In *Proc. European Conference on Machine Learning*, Nedellec, C. and C. Rouveird (eds), Berlin, Germany: Springer-Verlag, pp. 280–291, 1998 advocate extending the concept of forward error correction to model combining to improve robustness. Gamberger and Lavrac "Confirmation Rule Sets," *Proc. KDD2000*, Lyon, France, September 2000 introduce the concept of confirmation rule sets, which are based on two intuitive principles—consensus and deferment of decision if uncertain until more evidence is received (a.k.a. sequential decision-making). Tumer and Ghosh "Error Correlation and Error Reduction in Ensemble Classifiers," *Connection Science*, Vol. 8, Nos. 3–4, pp. 385–404, 1996 describe ranking the outputs of the first-stage classifiers so that the second-stage classifier (i.e., multiple-model combiner) can be optimized for the selected subset of the first-stage outputs. They advocate combining highly correlated classifier outputs. None of these papers address the central need for assessing the extent to which the selected DM algorithm captures useful information embedded in raw data. Moreover, the lack of such quantification is the motivating force behind the development of such complex, tedious, and somewhat ad hoc techniques for combining the outputs of multiple classifiers.

Chen et al. (U.S. Pat. No. 5,727,199) also explore a two-step approach for feature identification and derivation of classification rules, which are tangentially similar to the U.S. Pat. No. 5,479,523. Again, this patent focuses on identifying the optimal feature subset.

Thus, there is a need for a convenient means of estimating the extent to which a DM algorithm captures useful information in raw feature data, such that a user knows when optimal performance has been obtained.

SUMMARY OF THE INVENTION

In general, the present invention is a system and method for estimating the point of diminishing returns for additional information in data mining processing applications. The present invention provides a convenient method of estimating the extent to which a data mining algorithm captures useful information in raw feature data.

First, the input data is processed using a forward transform. A region of overlap Y in the forward transformed data is identified and quantified. The region of overlap Y is processed with a reverse transform to create an overlap region Z in an original feature space. The degree of overlap in region Z is quantified and compared to a level of overlap in the Y region, such that the comparison quantifies the extent to which a data mining algorithm captures useful information in the input data.

In one embodiment of the present invention, if a dimension N of the feature set is above a threshold value, the input features are orthogonalized with a level of overlap in region Z to convert to N one-dimensional vectors. The level of overlap in region Z is computed as a combination of each probability density function (PDF) for each of the N one-dimensional vectors. This reduces the complexity of the requisite calculations and minimizes adverse affects associated with the "curse of dimensionality."

Additionally, the degree of overlap is preferably determined using linear regression. The magnitude of the resultant slope is proportional to the extent to which useful information in the feature space is captured by a classification algorithm. That is, as the amount of overlap increases in Y, so should the amount of overlap increase in Z.

Portions of the present invention may be conveniently implemented using a conventional general purpose or a specialized digital computer or microprocessor programmed according to the teachings of the present disclosure, as will be apparent to those skilled in the computer art. Appropriate software coding can readily be prepared by skilled programmers based on the teachings of the present disclosure, as will be apparent to those skilled in the software art.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventors for carrying out the invention. Various modifications, however, will remain readily apparent to those skilled in the art, since the basic principles of the present invention have been defined herein specifically to provide a system and method for estimating the point of diminishing returns for additional information in data mining processing applications. Any and all such modifications, equivalents and alternatives are intended to fall within the spirit and scope of the present invention.

In general, the present invention provides a convenient means of estimating the extent to which a DM algorithm captures useful information in raw feature data. This process provides the user with a sense of assurance that the underlying DM algorithm has done its best in extracting all the useful information embedded in raw data and that there is little to be gained by spending more time on trying to improve performance using different algorithms. If the achieved performance is not good enough, then the user knows that he or she must improve sensors, use additional sensors, and/or collect more data in order to improve performance further, and not spend more time on trying out different DM algorithms.

The present invention presents a method to quantify the extent to which a data-mining (DM) algorithm captures useful information embedded in input data. The key concept is forward-reverse mapping between feature space and classification space, and then performing confusion analysis. That is, the present method quantifies the consistency in the levels of confusion in the two spaces.

First, we will define variables to be used throughout this section. The input feature vector is denoted as X. The dimension of X is equal to the size of the feature vector and is denoted as N. The classification output is denoted as Y, where y represents the log-likelihood ratio (LLR) generated by a classification algorithm for each test feature vector with a known class label. The dimension of Y is 1.

For a two-class problem, the output space spanning Y has two class-conditional probability density functions (PDFs): P(Y=y|Class=1)/P(Y=y|Class=2) for feature vectors that belong to Class 1 and P(Y=y|Class=1)/P(Y=y|Class=2) for those that belong to Class 2. The larger the separation between the two PDFs, the better it is. The classification algorithm forward transforms X into Y, thereby achieving dimension reduction from N to 1. The reverse transformed space is known as Z.

Figure 4:
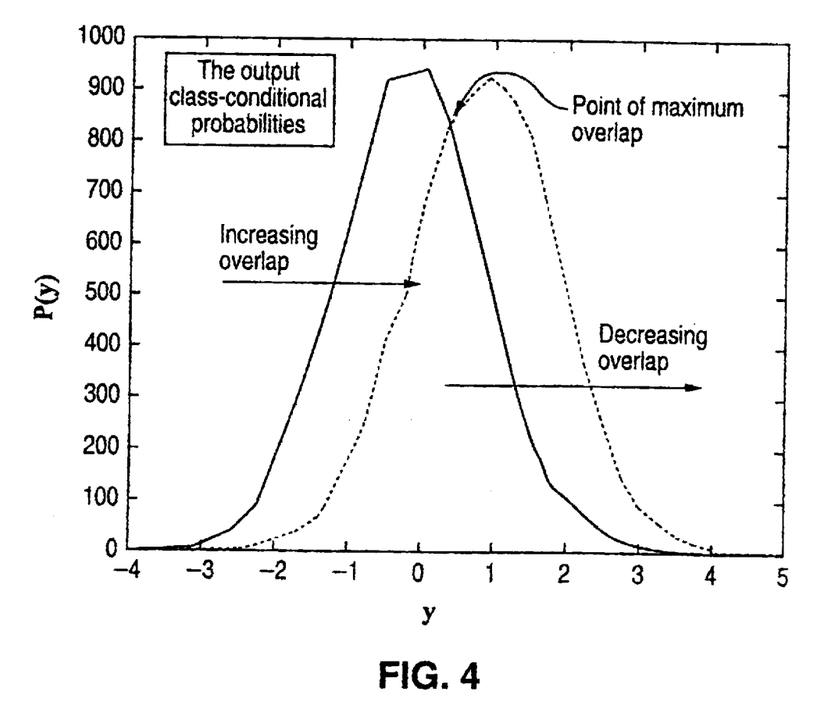
FIG. 4 shows two class-conditional probability density functions (PDFs) and illustrates the concept of overlap.

First, the input data is processed using a forward transform. A region of overlap in the forward transformed space Y is identified and quantified. The word "overlap" is used loosely here for the time being and represents a phenomenon of having two class-conditional PDFs similar in value qualitatively. That is, the two class-conditional PDFs have similar probabilities in the region of overlap. FIG. 4 shows this concept.

As shown in FIG. 4, as y increases from the left to the right up to the point of maximum overlap (the intersection of the two probability curves), the amount of overlap increases. Beyond the point of maximum overlap, the amount of overlap decreases as y increases further.

The region of overlap in Y is processed with a reverse transform to create an overlap region Z in an original feature space. The degree of overlap in region Z is quantified and compared to that in the Y region, such that the comparison quantifies the extent to which a data mining algorithm captures useful information in the input data.

Figure 1:
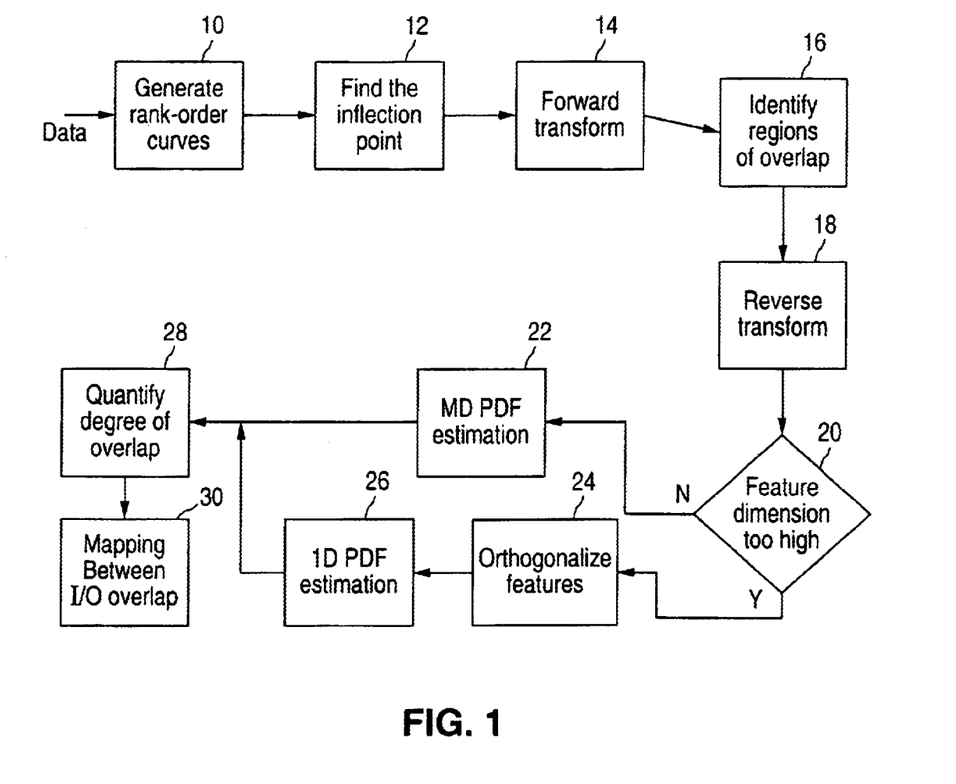
FIG. 1 is a flowchart of one embodiment of the present invention.
Figure 2:
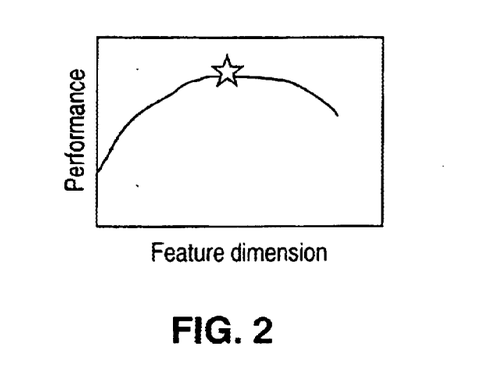
FIG. 2 is a graph illustrating the "inflection point" at which an increase in feature dimension does not improve performance.
Figure 3:
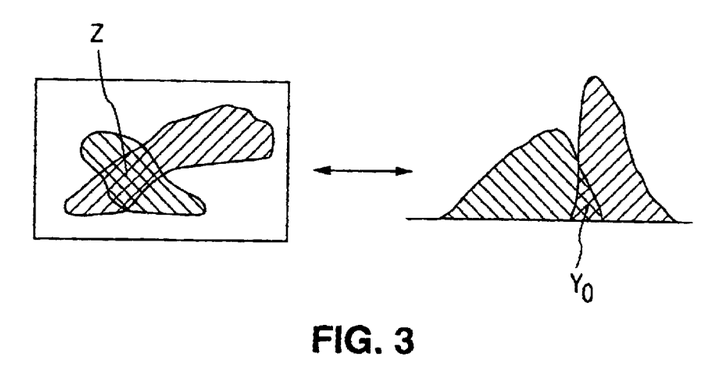
FIG. 3 illustrates sample $Y_o$ and Z overlap regions.

FIG. 1 illustrates one embodiment of the present method. The invention consists of the following steps:

1. Generate a rank-order curve (block 10) to estimate the feature dimension at which DM performance reaches an inflection point (block 12). The inflection point is illustrated in FIG. 2, and is the point at which the DM performance reaches a maximum point. Let X denote the feature set that contains all the features up to the point of diminishing returns (inflection point).
2. Transform the vector space spanned by the features in X into a one-dimensional decision space using any mapping function from a library of classification algorithms. The library may include various artificial neural networks, statistical classifiers, and non-parametric classifiers. This step constitutes the forward transform (block 14).
3. Calculate the degree of confusion (i.e. level of overlap between the curves) between different output classes in the decision space. As shown in FIG. 4, the level of overlap can be adjusted with y. As one approaches the point of maximum overlap from left to right, the level of overlap between the two class-conditional PDFs increases. Denote the region of high overlap in the decision space as $Y_o$ (block 16). The region $Y_o$ is shown in FIG. 3. $Y_o$ is a subset of Y, which spans the entire DM output space. In short, a segment in Y where $P_Y(Class=1) P_Y(Class=2)$ is designated as $Y_o$. This step can be performed to specify a finite number of regions ($Y_o(n)$), with n corresponding to a different level of overlap.
4. Transform each region of overlap in the decision space into the original feature space. This procedure involves identifying feature vectors that fall into the area of overlap $Y_o$. This is the reverse transform (block 18). Let Z represent the overlapped region in the original feature space. The region Z is shown in FIG. 3.
5. If the dimension of the feature space is too high (block 20), linear or non-linear principal component analysis is used to orthogonalize the input features (block 24) with the overall level of overlap computed as the sum of the information-theoretic measure derived from each marginal probability density function (PDF) (i.e. a one-dimensional PDF estimation—block 26). If the feature dimension is too high, the probability density function is too difficult to calculate (due to the high dimensionality) and therefore the present invention transforms the multi-dimensional problem into N one-dimensional problems. The results of each one-dimensional calculation are then combined. This increases the efficiency of performing the calculations. Otherwise, a Parzens window is used to estimate the multi-dimensional (MD) class-conditional feature PDF, from which the level of overlap can be estimated in one step (block 22).
6. Next, quantify the degree of overlap in Z using an appropriate information-theoretic measure, such as Kullback-Leibler divergence, Bhattacharrya distance, and multi-modal overlap measure (block 28). As long as the same information-theoretic measure is used throughout the point-of-diminishing returns analysis, the results should be consistent. Depending on the level of noise, smoothing techniques, such as exponential filtering, may be applied to reduce the amount of noise.
7. Finally, map the level of overlap by creating a table of two columns, where the first column contains the level of overlap in the decision space spanned by Y and the second column the level of overlap in the feature space spanned by Z. Perform linear regression between the two columns. The magnitude of the resultant slope is proportional to the extent to which useful information in the feature space is captured by a classification algorithm. That is, as the amount of overlap increases in Y, so should the amount of overlap increase in Z.

The "degree of confusion" or "level of overlap" as used herein refers to the extent to which it is difficult to differentiate multiple outcomes based on input features. The degree of confusion between Class A and Class B is high if the amount of overlap between the two class conditional feature probability density functions exhibit a high degree of overlap. The degree of confusion can be quantified by measuring the amount of overlap in the feature space.

In further detail, when the probability density functions are plotted (i.e. FIG. 6), inside the over-lap region there is an "area of confusion." In other words, a point in the overlap region may be in the middle of one region, but on the edge of the second region. Thus, there is "confusion" as to which output class the point should be assigned. The present invention provides a metric to quantify this level of "confusion" (i.e. overlap), and thereby assists the user in determining when an optimal data mining algorithm has been chosen from among a set of algorithms for processing the input data.

Figure 5:
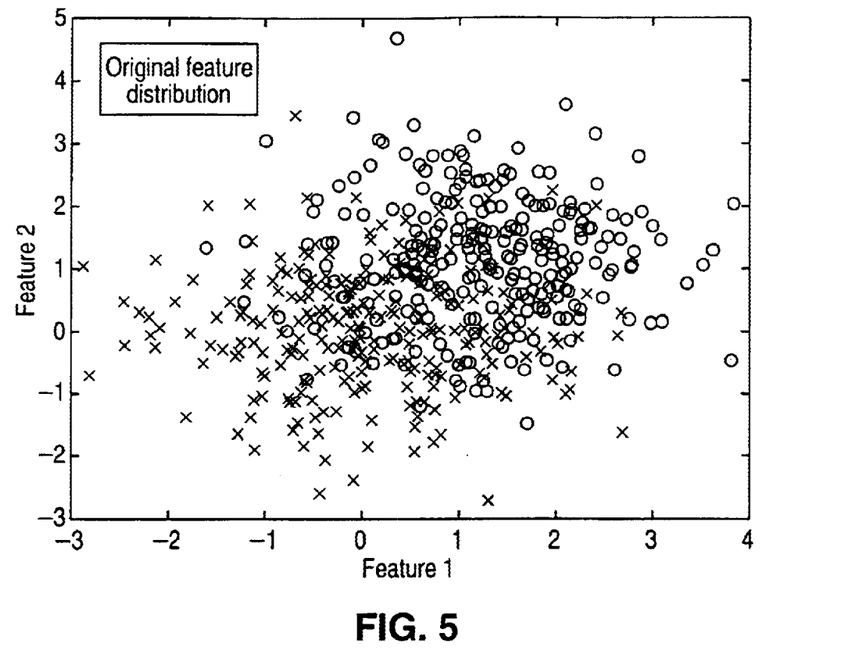
FIG. 5 is a graph of an original feature distribution for two output classes.
Figure 6:
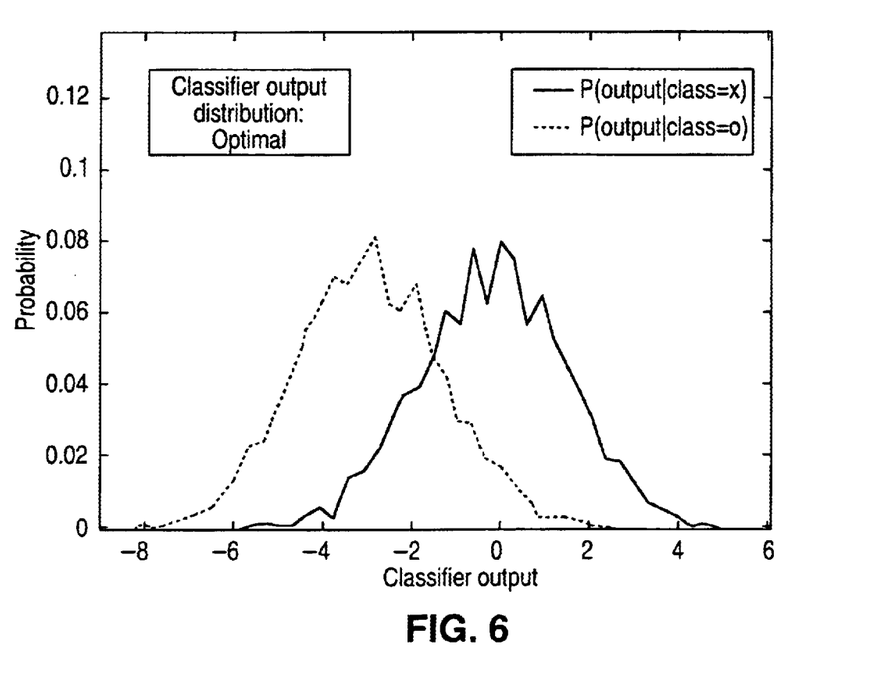
FIG. 6 is a graph of the results of a forward transform using an optimal data mining algorithm.
Figure 7:
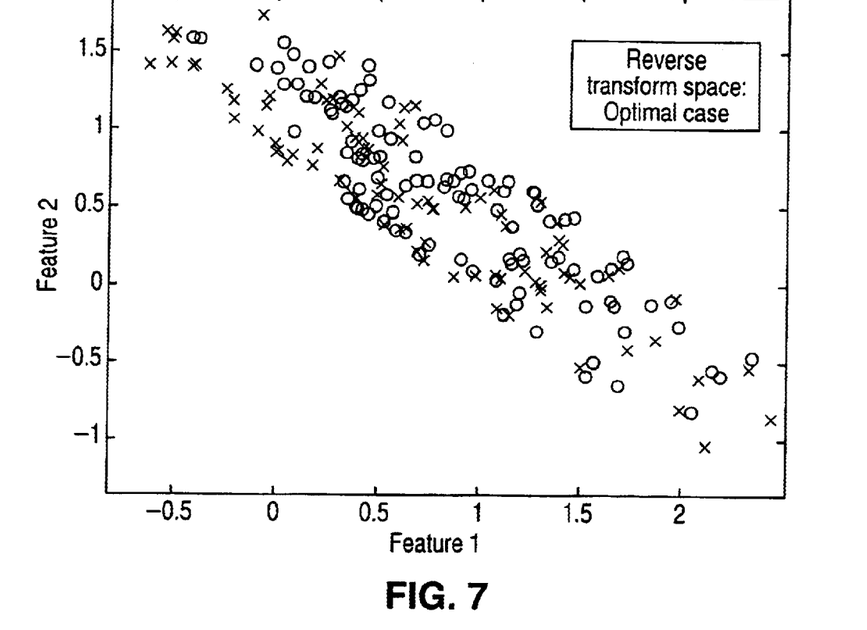
FIG. 7 is a graph of the results of a reverse transform for the optimal data mining algorithm showing high degree of overlap.
Figure 8:
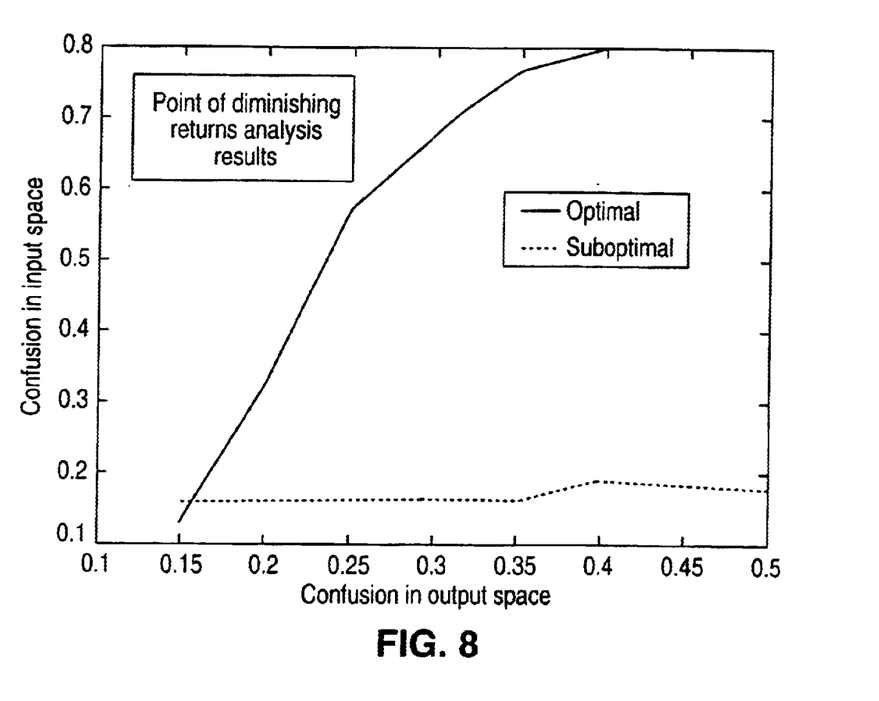
FIG. 8 is a quantification plot illustrating that when a selected data mining algorithm is optimal, there is a linear relationship between the amount of confusion in the output space and in the input space.

FIGS. 5–10 illustrate an application of the present invention with a simple two-class problem. FIG. 5 shows the original feature distribution, where each target class is coded ("x" and "o" for two output classes). FIG. 6 displays the results of the forward transform using an optimal data mining algorithm, which in this case is a simple multivariate Gaussian (MVG) classifier. FIG. 7 shows the results of the reverse transform for the optimal data mining algorithm (i.e., vector space Z). Note that the amount of overlap between the two classes in Z is high. In this case, even though the actual data mining performance may not be as high as the user would like, the data mining performance cannot be improved further by trying out a different data mining algorithm. Thus, the user should focus on other efforts that will actually produce improved results, and not on trying out different data mining algorithms.

Figure 9:
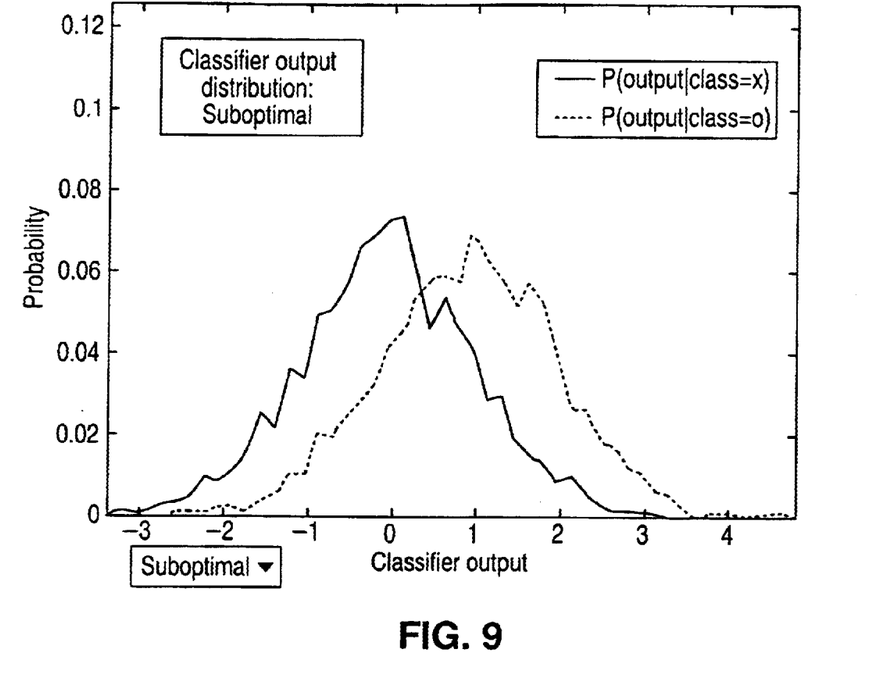
FIG. 9 is a graph of the results of a forward transform using a sub-optimal data mining algorithm.

On the other hand, assume that the selected data mining algorithm is less than ideal. FIG. 9 shows the results of the forward transform. The question confronting the user at this point is whether or not DM performance can be improved further by employing a different DM algorithm.

Figure 10:
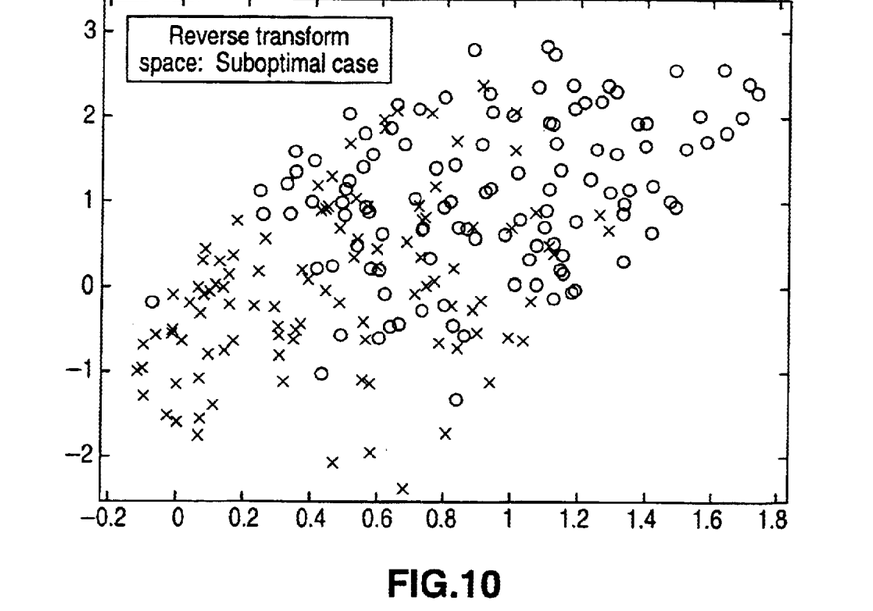
FIG. 10 is a graph of the results of a reverse transform for the sub-optimal data mining algorithm showing a low amount of overlap.

The actual vector space created by the reverse transform is shown on FIG. 10. As can be seen, the amount of overlap in Z is a lot smaller (the x's and o's are more dispersed in relatively non-overlapped regions). This observation suggests that more work can be done to improve performance further. The quantification plot in FIG. 8 demonstrates clearly that when the selected data mining algorithm is optimal, there is a monotonically increasing linear relationship between the amount of confusion (overlap) in the output space and that in the feature space. On the other hand, there is no such relationship when the selected data mining algorithm is far from optimal, hinting that the user should implement a different algorithm to improve performance.

In summary, the present invention provides a convenient and intuitive means of integrating the feature and decision spaces in order to identify the point of diminishing returns in data mining. This approach allows a user to quantify using regression the extent to which the underlying data mining algorithms capture useful information embedded in raw data.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, microdrive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, requesting web pages, serving web pages, including html pages, Java applets, and files, establishing socket communications, formatting information requests, formatting queries for information from a probe device, formatting SMNP messages, and the display, storage, or communication of results according to the processes of the present invention.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for quantifying an extent to which a data mining algorithm captures useful information in input data, the method comprising:

performing a forward transform on input data;

identifying and quantifying a region of overlap $Y_o$ in the forward transformed data;

performing a reverse transform on the overlap region $Y_o$ to create an overlap region Z in an original feature space;

quantifying a degree of overlap in region Z;

comparing a level of overlap in the $Y_o$ region with a level of overlap in the Z region; and quantifying the extent to which a data mining algorithm captures useful information in the input data, based upon a result of the comparison in the levels of overlap between the $Y_o$ region and the Z region.

2. The method of claim 1, further comprising:

generating a rank-order curve to estimate a feature dimension at which data mining performance reaches an inflection point prior to performing the forward transform.

3. The method of claim 2, wherein the performing the forward transform comprises transforming a feature set that contains all the features up to the inflection point into a one-dimensional decision space.

4. The method of claim 3, wherein quantifying a region of overlap $Y_o$ in the forward transformed data comprises calculating a degree of overlap between different output classes in the decision space.

5. The method of claim 4, wherein calculating a degree of overlap comprises using one of Kullback-Leibler divergence, Bhattacharrya distance, and multi-modal overlap measures.

6. The method of claim 4, wherein it a dimension N of the feature set is above a threshold value, the input features are orthogonalized with a level of overlap in region Z to convert to N one-dimensional vectors.

7. The method of claim 6, wherein the level of overlap in region Z is computed as a sum of each probability density function (PDF) for each of the N one-dimensional vectors.

8. The method of claim 4, wherein if a dimension N of the feature set is less than a threshold value, a level of overlap in region Z is computed using a Parzens window to estimate a multi-dimensional class-conditional feature probability density function (PDF).

9. The method of claim 4, wherein comparing a level of overlap in the $Y_o$ region with a level of overlap in the Z region comprises performing a linear regression between the two regions, such that a magnitude of a slope is proportional to the extent to which a data mining algorithm captures useful information in the input data.

10. A method to quantify how close a data mining algorithm is to optimal performance for a given set of input data, the method comprising:

performing a forward transform on input data;

calculating a degree of confusion in a region of overlap $Y_o$ in the forward transformed data;

performing a reverse transform on the overlap region $Y_o$ to create an overlap region Z in an original feature space;

calculating a degree of confusion in overlap region Z; and performing a linear regression between the level of confusion in the $Y_o$ region and the level of confusion in the Z region, such that a magnitude of a slope is proportional to the extent to which a data mining algorithm captures useful information in the input data.

11. A computer readable medium including computer code for quantifying an extent to which a data mining algorithm captures useful information in input data, the computer readable medium comprising:

computer code for performing a forward transform on input data;

computer code for identifying arid quantifying a region of overlap $Y_o$ in the forward transformed data;

computer code for performing a reverse transform on the overlap region $Y_o$ to create an overlap region Z in an original feature space;

computer code for quantifying a degree of overlap in region Z;

computer code for comparing a level of overlap in the $Y_o$ region with a level of overlap in the Z region; and computer code for quantifying the extent to which a data mining algorithm captures useful information in the input data based upon a result of the comparison in the levels of overlap between the $Y_o$ region and the Z region.

12. A computer system for quantifying how close a data mining algorithm is to optimal performance for a given set of input data, the computer system comprising:

a processor; and computer program code that executes on the processor, the computer program code comprising:

computer code for performing a forward transform on input data;

computer code for identifying and quantifying a region of overlap $Y_o$ in the forward transformed data;

computer code for performing a reverse transform on the overlap region $Y_o$ to create an overlap region Z in an original feature space;

computer code for quantifying a degree of overlap in region Z;

computer code for comparing a level of overlap in the $Y_o$ region with a level of overlap in the Z region; and computer code for quantifying how close a data mining algorithm is to optimal performance for a given set of input data based upon a result of the comparison in the levels of overlap between the $Y_o$ region and the Z region.

* * * * *